United States Patent [19]

Weber

[11] Patent Number: 4,866,287

[45] Date of Patent: Sep. 12, 1989

[54] OPTICAL SURFACE WAVINESS MEASURING APPARATUS

[75] Inventor: Klaus Weber, Königsbronn, Fed. Rep. of Germany

[73] Assignee: Erwin Sick GmbH Optik-Elektronik, Waldkirch, Fed. Rep. of Germany

[21] Appl. No.: 264,101

[22] Filed: Oct. 28, 1988

[30] Foreign Application Priority Data

Nov. 5, 1987 [DE] Fed. Rep. of Germany ....... 3737632

[51] Int. Cl.⁴ ............................................. G01N 21/86
[52] U.S. Cl. .................................... 250/571; 356/371
[58] Field of Search ............... 250/560, 561, 571, 572, 250/562, 563; 356/371, 445, 448

[56] References Cited

U.S. PATENT DOCUMENTS 3,866,038  2/1975  Korth ................................. 356/371
4,803,374  2/1989  Monfort et al. ..................... 250/571

Primary Examiner—David C. Nelms
Attorney, Agent, or Firm—Townsend and Townsend

[57] ABSTRACT

A surface waviness measuring apparatus for specularly reflecting surfaces has a light source (22) and an optical system (23) which directs a light beam (24) obliquely onto the surface (14), with the light beam (24) forming a small primary light bead (12) there. A spherical concave mirror (11) is arranged at the angle of reflection (α) with the center of curvature (13) of the spherical concave mirror being arranged closely adjacent the small primary light bead (12) on the reflecting surface (14). A photoreceiver arrangement (16) is located at the angle of reflection of the light beam (15) reflected from the concave mirror (11).

3 Claims, 1 Drawing Sheet

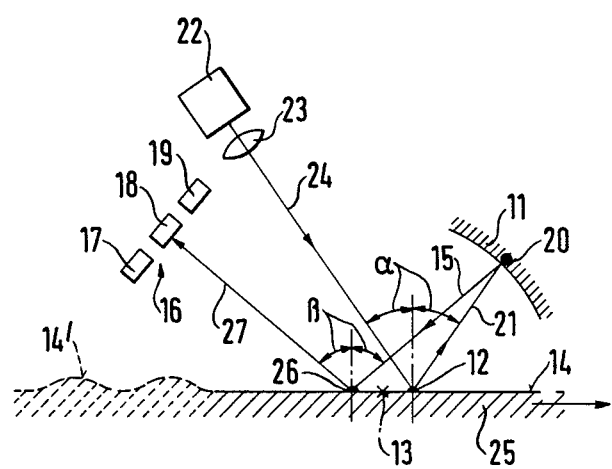

OPTICAL SURFACE WAVINESS MEASURING APPARATUS

The invention relates to an optical surface waviness measuring apparatus for specularly reflecting surfaces, the apparatus comprising a light source and an optical system which directs a light beam obliquely onto the surface at an angle differing from 90° with the light beam generating a stationary small light bead at the surface.

Devices for measuring the waviness of surfaces are known (DE-OS No. 34 28 718.3).

The object of the present invention is to provide an optical surface waviness measuring apparatus which not only permits the determination of waviness in a particular direction but also in addition to this compensates for any tilting of the material web as a whole.

In order to satisfy this object the invention provides that the spherical concave mirror is arranged at the angle of reflection with the centre of curvature of the concave mirror being arranged closely adjacent the small primary light bead on the reflecting surface; and that a photoreceiver arrangement with at least two individual photoreceivers is arranged at the angle of reflection of the light beam which is reflected from the concave mirror. Thus, in accordance with the invention the light beam which impinges obliquely on the substantially plane surface is reflected twice at the surface, which is essentially flat other than the waviness, by means of the image forming retroreflector provided in accordance with the invention. As a result of the displacement of the centre of curvature of the concave mirror and the small primary light bead a secondary light bead arises at the opposite side of the centre of curvature, with the spacing of the two light beads or the spacing of the centre of curvature from the primary light bead preferably being variable. The photoreceiver arrangement can in the simplest case consist of a difference diode or a position sensitive receiver. For precise measurements a diode row is expediently used.

The change in spacing between the primary light bead and the centre of curvature can be realised in accordance with a practical embodiment in that the concave mirror is restrictedly tiltable about an axis perpendicular to the plane of reflection of the incident beam and the emergent beam.

The invention will now be described in the following by way of example and with reference to the drawing.

BRIEF DESCRIPTION OF THE DRAWING

The FIGURE shows a schematic sideview of an optical surface waviness measuring apparatus in accordance with the invention.

In accordance with the drawing a laser 22 transmits a sharply bundled transmitted light beam 24 via a beam widening optical system 23 at an angle $\alpha$ of approximately 30° to 45° to the normal onto the substantially planar surface of an article 25. The object can optionally be moved in the direction of the arrow beneath the surface waviness measuring apparatus.

The sharply bundled transmitted light beam 24 generates on the surface 14 a small primary light bead 12, the diameter of which can amount to approximately 1 to 3 mm. As the surface 14 is specularly reflecting a reflex beam 21 is reflected at the reflection angle and impinges on the spherical concave mirror 11 which is arranged spaced essentially by the distance of its radius from the primary light bead 12. Precisely stated, the centre of curvature 13 of the spherical concave mirror 12 is located adjacent but at a small distance from the primary light bead 12 so that the emergent beam 15 reflected from the concave mirror 11 includes a small angle with the incident beam 21 and impinges on the surface 14 on the far side of the centre of curvature 13 and there generates a secondary light bead 26. The angle of incidence $\beta$ of the emergent beam 15 on the surface 14 is somewhat larger than the angle $\alpha$. A secondary reflected light beam 27 is then directed at the angle of reflection $\beta$ to a linear photoreceiving arrangement 16, the longitudinal extent of which extends substantially perpendicular to the secondary reflection beam 27 and in the plane of the drawing. The photoreceiver arrangement 16 consists in the embodiment of three photoreceivers 17, 18 and 19 arranged in a row.

The concave mirror 11 is tiltable to a small degree about an axis 20 perpendicular to the plane of the drawing whereby the spacing of the centre of curvature 13 from the primary light bead 12, and thus the spacing of the two light beads 12, 26 can be varied in a desired manner. This change of distance is expedient in order to be able to ideally measure specific degrees of waviness.

The manner of operation of the described surface waviness measuring apparatus is as follows:

The concave mirror 11 generates alongside the centre of curvature 13 the mirror image of the primary light bead 12 as a secondary light bead 26. If the substantially plane surface 14 is tilted as a whole somewhat in the one or other direction, in particular about an axis perpendicular to the plane of the drawing, then the point of incidence of the secondary reflected light beam 27 on the photoreceiver arrangement 16 does not change. If however different surface inclinations exist at the locations of the primary light bead 12 and of the secondary light bead 26 about axes perpendicular to the plane of the drawing then the secondary reflected beam 27 falls, depending on this difference in inclination either on the photoreceiver 17 or on the photoreceiver 19. Differences in inclination in the region of the light beams 12, 26 can thus be detected with the photoreceiver arrangement 16. If no differences in inclination are present then the secondary reflected beam 27 falls onto the central photoreceiver 18.

In order to explain the invention the surface 14 of the article 25 is shown entirely flat beneath the illustrated surface waviness measuring apparatus. Waviness such as is to be detected with the apparatus of the invention is shown to the left at 14' in broken lines adjacent the surface 14. By setting a suitable distance between the light beads 12, 26 it is possible to ideally detect any existing waviness and to indicate it by the electronic evaluation circuit connected to the photoreceiver arrangement 16. Moreover the distance between the light beads could be varied, for example swept, through a predetermined range to ensure that waviness is detected by precluding the situation in which the two light beads fall on different portions of a wave with a wavelength such that the beam 27 nevertheless falls on the central photodetector 18.

In any event it is the difference of the inclinations that is indicated, i.e. the second differential function.

I claim:

1. Optical surface waviness measuring apparatus for specularly reflecting surfaces, the apparatus comprising a light source and an optical system which directs a light beam obliquely onto the surface at an angle differing from 90° with the light beam generating a small preferably stationary light bead at the surface, characterised in that the optical axis of a spherical concave mirror (11) is arranged at the angle of reflection ($\alpha$) with the centre of curvature (13) of the concave mirror being arranged closely adjacent the small primary light bead (12) on the reflecting surface (14); and in that a photoreceiver arrangement (16) with at least two individual photoreceivers (17, 18, 19) is arranged at the angle of reflection ($\beta$) of the light beam (15) which is reflected from the concave mirror (11) and once again from the surface (14).

2. Apparatus in accordance with claim 1, characterised in that the spacing of the centre (13) of curvature from the small primary light bead (12) is adjustable.

3. Apparatus in accordance with claim 2, characterised in that the concave mirror (20) is restrictedly tiltable about an axis perpendicular to the reflection plane of the incident beam (21) and the emergent beam (15).

* * * * *